Figure 1:
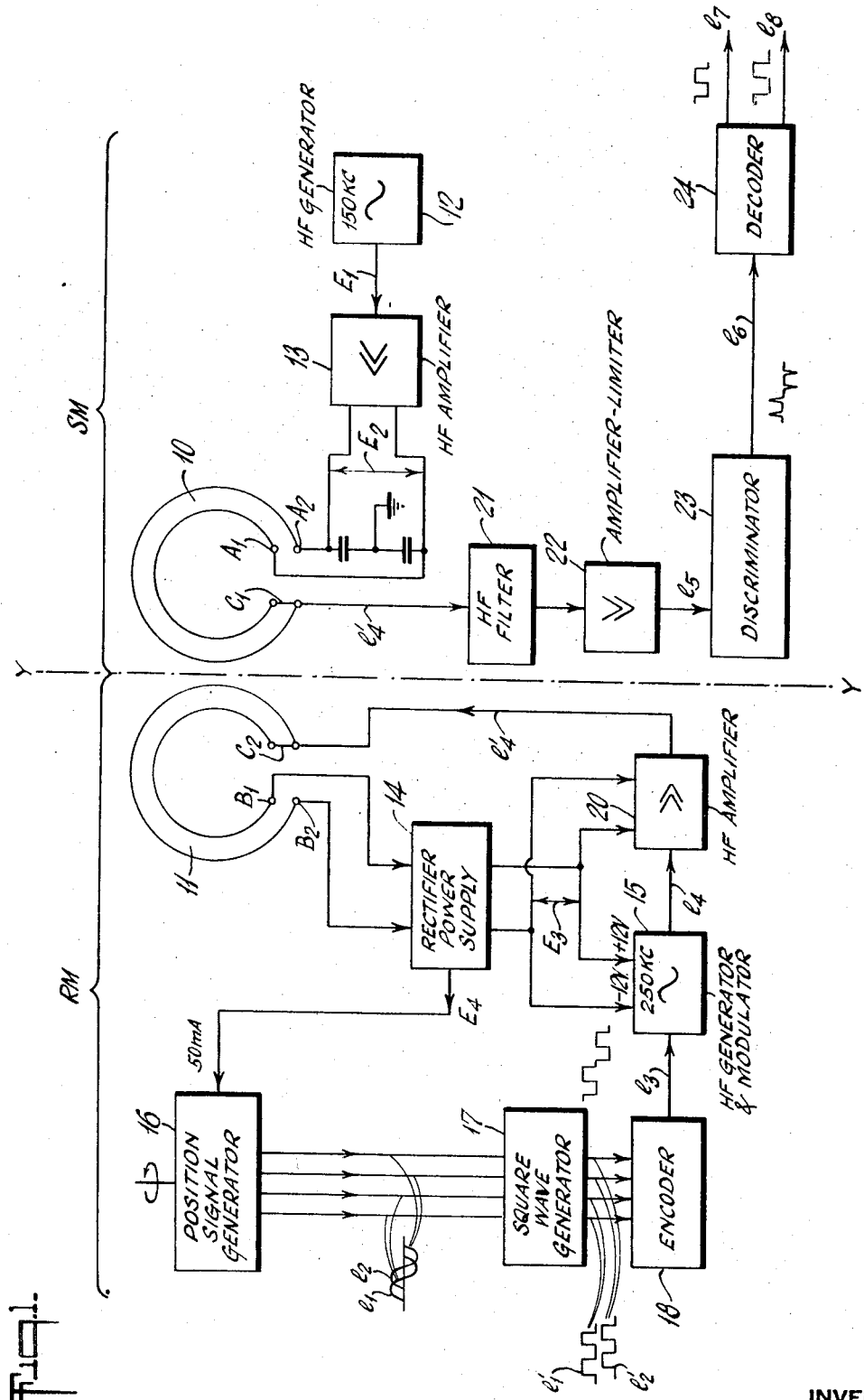

United States Patent
Glantschnig et al.

[15] 3,657,717
[45] Apr. 18, 1972

[54] SYSTEM OF DIGITAL MEASUREMENT OF THE POSITION OF A FIRST MEMBER SLIDABLY MOUNTED UPON A SECOND ROTATING MEMBER

[72] Inventors: Fritz Glantschnig, Neuenhof; Manfred Tiesnes, Nussbaumen, both of Switzerland

[73] Assignee: Patelhold Patentverwertungs- & Elektro-Holding AG, Glarus, Switzerland

[22] Filed: June 5, 1970

[21] Appl. No.: 43,844

[30] Foreign Application Priority Data

June 6, 1969 Switzerland .......................... 8636/69

[52] U.S. Cl. ....................... 340/347 SY, 340/347 P, 340/195
[51] Int. Cl. ..................................... G08c 9/04, H03k 13/00
[58] Field of Search .................. 340/347 PR, 195, 196, 345, 340/177 R, 347 SY; 343/6.5, 720, 741, 742; 73/136 R, 362; 318/606, 640

[56] References Cited

UNITED STATES PATENTS

| | | | |
|---|---|---|---|
| 3,268,880 | 8/1966 | Miller | 340/195 X |
| 3,530,449 | 9/1970 | Andersen | 340/195 X |
| 3,172,107 | 3/1965 | Morris | 343/6.5 X |
| 3,098,187 | 7/1963 | Sciaky | 318/640 X |

Primary Examiner—Thomas A. Robinson
Attorney—Greene & Durr

[57] ABSTRACT

A system of digital measurement of the position of a first member slidably mounted upon a second rotating member comprises a first stationary coupling coil and a second similar coupling coil mounted upon the second member coaxially with the rotary axis thereof and parallel to said first coil. Energy produced by a stationary high frequency power generator is fed to said first coil and transmitted inductively to the second coil from which it is derived and rectified, to provide d.c. power upon the rotating member for the energization of a pulse former producing digital position signals proportional to the movement of said first member and of a high-frequency signal generator modulated by said position signals. The output energy of the signal generator is transmitted inductively via said coils in a direction opposite to the transmitting direction of the power energy and the signal energy derived from the first coupling coil demodulated, to retrieve the original position signals for application to a translating device. In order to effect full decoupling between the power and signalling circuits, the power energy is transmitted in symmetrically balanced relation and the signal energy is transmitted in unbalanced relation to the center points of the coils as potential reference.

9 Claims, 3 Drawing Figures

INVENTORS
FRITZ GLANTSCHNIG
MANFRED TIESNES
BY
KARL RATH
ATTORNEY

INVENTORS
FRITZ GLANTSCHNIG
MANFRED TIESNES
BY
KARL RATH
ATTORNEY

SYSTEM OF DIGITAL MEASUREMENT OF THE POSITION OF A FIRST MEMBER SLIDABLY MOUNTED UPON A SECOND ROTATING MEMBER

The present invention relates to the continuous digital measurement of the position of a first member slidably mounted upon a second rotating member, in particular to the measurement of the movement of the planar slide mounted upon the planar disk of a machine tool, while the tool engages the work during rotation of said disk and the movement of the slide is measured directly upon said disk and converted into electric signals by means of an analog-digital converter.

In many types of machine tools, in particular tools for the carrying out of boring and milling operations by way of a radial slide mounted upon a rotating disk, the problem exists to continuously measure the exact position of the tool or slide while the disk rotates and the tool engages the work.

The problem assumes a special importance where a high accuracy is required of the diameter operated on and where the movement of the slide is to be controlled numerically, such as in the case of automatic tool control.

It is already known, in order to translate the position of the slide, to provide an analog-digital converter in the gear train of the slide exteriorly of the latter, with the number of digital pulses being suitably chosen in relation to the transmission ratio such as to produce for instance one pulse for each one-thousandth inch displacement of the slide.

Among the various disadvantages of a solution of this type are low accuracy and lack of reproduceability, due mainly to the fact that the drive of the slide may comprise as many as 20 gear pairs resulting in a total play, even in case of extreme precision construction, being 10 to 30 times the practically required value or accuracy. Furthermore, such a great play of the parts makes it difficult to approach a desired position from different directions, whereby to practically limit operation and measurement to a single direction of movement. Additional inaccuracy may be introduced by torsion effects within the gear train depending upon the load and undeterminable in advance. Finally, the measuring accuracy is subject to deterioration caused by wear and age of the gears.

In order to overcome the afore-described difficulties, it is principally possible to measure the movement of the slide directly upon the disk by means of a converting device comprising a rack and pinion in conjunction with an analog-digital converter translating the rotational angle of the pinion into electric digital signals derived from the disk via slip ring connectors. This solution involves however other difficulties by requiring at least four separate slip rings and sliding brushes, that is, two for the power transmission and two for the signal transmission to and from the rotating disk, a requirement difficult to fulfill constructionally and satisfactorily in practice. Besides, it is necessary to absolutely avoid even relatively short interruptions of the relatively moving contacts, to ensure a safe and distortion-free transmission of the measuring signals or pulses. In order to minimize this drawback, multiple ring and brush devices would have to be used, whereby to further complicate both the construction and operation of a system of this type.

In view of the difficulties mentioned and of the normally prevaling considerable smudging and soiling of the parts by metal chips and dust, and furthermore in view of the impact and vibratory forces to which the parts are subjected during operation, a practically satisfactory solution of the problem herein described and involved could not be realized in the past.

Accordingly, an important object of the present invention is the provision of a new improved system of the referred to type for the continuous digital measurement of the movement or position of a slidable member mounted upon a rotating member, which new system is substantially devoid of the afore-mentioned and related difficulties and drawbacks, which is practically realizable by the use of conventional construction elements and circuitry, and which will enable the achievement of extremely high measuring accuracies in conjunction with high operating safety and reliability.

Figure 2:
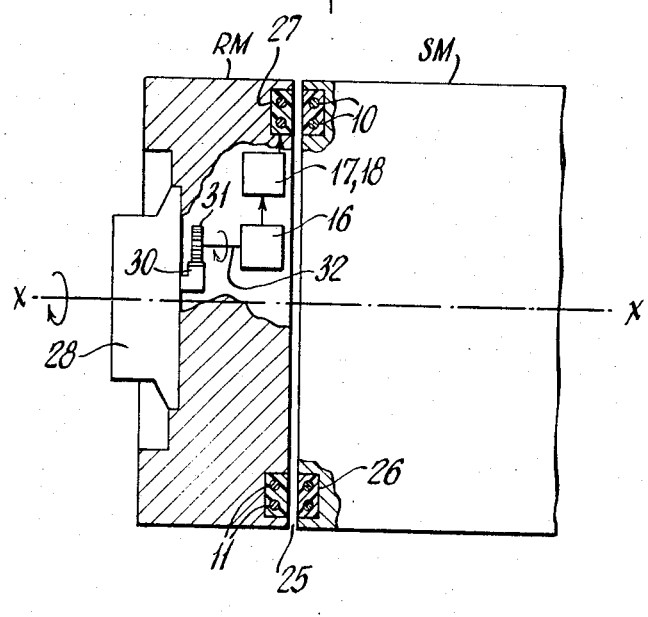
Figure 3:
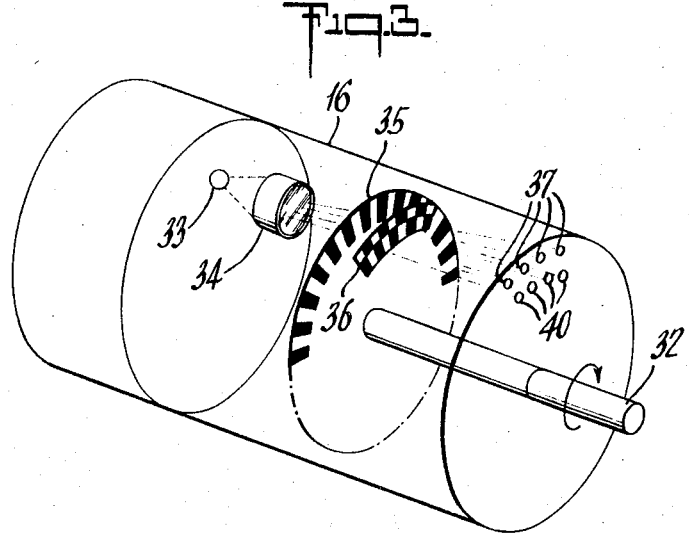

The invention, both as to the foregoing and ancillary objects as well as novel aspects thereof, will be better understood from the following detailed description of a preferred practical embodiment, taken in conjunction with the accompanying drawings forming part of this disclosure and in which:

FIG. 1 is a schematic diagram of a digital position measuring system for a slidable member mounted upon a rotating member, constructed in accordance with the principles of the invention;

FIG. 2 more clearly shows the mechanical arrangement of the rotating and slidable members; and FIG. 3 shows schematically and in perspective view a preferred digital-analog converter for use in conjunction with the invention.

Like reference characters denote like parts in the different views of the drawing.

With the foregoing objects in view, the present invention involves generally the provision of means in a system of the referred to type for the inductive transmission of high-frequency power energy from a stationary member to the rotating member of the system and rectification of said energy to provide d.c. power upon said rotating member for the energization of an analog-digital converter transforming the movement or position of the slidable member into proportionate digital signals, on the one hand, and for the energization of a high-frequency signal generator disposed upon said rotating member and preferably frequency-modulated by said digital signals, on the other hand. The modulated high-frequency energy is re-transmitted inductively to said stationary member for demodulation and utilization of the resultant original position signals to energize a translating device, such as a counter for indication or for comparison of the signals with position control or command signals in a feed back type automatic control system.

Transmission of both the high-frequency power and signalling energies to and from the rotating member is effected by way of a pair of inductive coupling coils mounted respectively upon the stationary member and the rotating member and designed and relatively arranged or aligned in such a manner as to maintain a substantially constant coupling coefficient independently of the relative rotation of the members. For this purpose, the use of a pair of two-turn flat coils arranged parallel to one another and concentrically with the rotary axis has been found to ensure satisfactory and optimal results in practice. In order to suppress mutual interference between the power and signal frequency circuits, the power and signal generators operate with different carrier frequencies and/or the respective energies are transmitted via said coils in symmetrically balanced and unbalanced relation, respectively, to the centers of the coil windings as potential reference points.

In order to discriminate between different directions of movement, a pair of digital pulse series are produced in relative quadrature phase relation with one of the series leading or lagging respectively the other series in dependence upon the direction of movement of the slide or like movable member. Both pulse series are combined into a single ternary series of both positive and negative pulses, with the positive pulses representing one direction and the negative pulses representing the opposite direction of movement, said ternary pulses being transmitted by modulation of the signal generator and converted into the original quadrature pulses for application to the translating or control device, these and other details and novel features as well as advantages of the invention becoming more apparent as the description proceeds in reference to the drawing.

Referring at first to FIG. 2, SM denotes a stationary part or member of a machine tool or the like and RM denotes the rotating member having mounted thereon a movable member or slide 28. Items 10 and 11 are a pair of flat inductive coupling coils disposed parallel to one another and mounted respectively in grooves 26 and 27 of the members SM and RM concentrically with the rotary axis $x$—$x$ of the member RM. The grooves 26 and 27 are filled with a synthetic resin or the like insulating and sealing material. As furthermore shown in FIG. 1, each of the coils 10 and 11 consists preferably of two concentric turns disposed in radial planes in respect to the rotary axis $x-x$ with one pair of adjoining ends of each pair of turns connected to provide center or reference points $C_1$ and $C_2$, respectively, for the purpose as further described hereinafter. As a consequence, the coupling coefficient between the coils remains substantially constant during relative rotation of the members. The distance between the coils 26 and 27 being non-critical may be relatively large, as may be the air gap 25 — about 2 mm in practice — between the members SM and RM. Accumulation of metal dust and other foreign matter in the gap 25 has substantially no effect on the inductive transmission of high-frequency energy between the coils.

Referring more particularly to FIG. 1, wherein the stationary parts upon member SM are shown to the right and the rotating parts on the member RM are shown to the left of of the dividing line $y-y$, the numeral 12 denotes an HF (high-frequency) power generator whose output $E_1$ is amplified by the HF power amplifier 13, to produce a final output $E_2$ of about 10 watt applied to the terminals $A_1$ and $A_2$ of the coupling coil 10 in push-pull fashion in respect to the center or reference point $C_1$. Due to eddy current losses in the metal masses and to the relatively loose coupling between the coils 10 and 11, the efficiency of transmission is about 15%, that is, the power induced in the coil 11 equals about 1.5 watt in the referred to example. This has been found sufficient for the energization of the integrated circuits and other devices disposed upon the member RM and described in the following.

The HF current induced in the coil 11 is applied, via terminals $B_1$ and $B_2$ of the coil to a conventional rectifier power supply 14 in which the HF energy is converted into d.c. energy. In the example shown, the d.c. power thus provided is in the form of a first +5 V supply voltage $E_4$, being preferably stabilized by a Zener diode to produce a constant output current of 50mA, and a second balanced −12V and +12V supply voltage $E_3$ for the energization of an HF signal generator 15, power amplifier 20 and other circuits and parts disposed upon member RM.

The signal generator 15 is modulated, preferably by frequency modulation by the aid of a capacitive diode, by the digital signals $e_3$ produced by the position signal generator 16, limiter 17 and directional encoder 18, to result in a modulated HF signal $e_4$ amplified by the amplifier 20. The amplified HF signal $e_4'$ is applied, via the center point $C_2$, to the coil 11 for transmission to a receiving circuit upon the member SM including an HF filter 21, HF amplifier 22 and a frequency discriminator 23. The discriminator 23 serves in a known manner to convert amplified HF receiving signal $e_5$ into the final signal $e_6$ which corresponds to the original position equal $e_3$ applied to generator 15.

More particularly and as more clearly described hereinafter, the position signal generator 16 is designed to produce a pair of sinusoidal output signals $e_1$ and $e_2$ with the signal $e_2$ leading or lagging respectively the signal $e_1$ by 90° in dependence upon the directional movement of the slide or member 28 relative to the member RM, FIG. 2. The signals $e_1$ and $e_2$ are converted into square pulses $e_1'$ and $e_2'$ in the pulse shaper and the quadrature square pulses combined in the directional encoder 18 into a single ternary modulating signal $e_3$ applied to the generator 15 and having positive and negative pulses corresponding respectively to different directions of movement of the member 28. The encoder 18 may comprise means to differentiate the signals $e_1'$ and $e_2'$ and to logically combine the differentiated signals, to result in the modulating signal $e_3$.

In order to prevent mutual interference between the power and signal frequency circuits, the HF generator 12 may have a carrier frequency differing from the carrier frequency of the generator 15. In a practical example, the power frequency may be 150 kilocycles and the signal frequency 250 kilocycles, as indicated in the drawing. Alternatively or additionally, the power and signal energies passing in different directions between the coils 10 and 11 may be transmitted in symmetrically balanced and unbalanced relation respectively to the center or reference points $C_1$ and $C_2$ as shown, to effect full decoupling between the power and signal frequency circuits.

FIG. 3 shows a preferred photo-electric analog-digital converter for producing position signals representative of the movement of member 28. For this purpose, the latter carries a rack 30, FIG. 2, engaged by a pinion 31 to the shaft 32 of which is connected the analog-digital converter 16 translating the rotational angle of the pinion into proportionate numbers of digital pulses. More particularly, shaft 32 carries a rotating shutter disk having alternate peripheral opaque and transparent segments aligned with a segmental shutter 36 stationary relative to the disk 35 and having two rows of similar shutter segments aligned with the segments of disk 35. The two rows of stationary segments are relatively displaced to result in a pair of quadrature signals $e_1$ and $e_2$ respectively in the output circuits of two sets of photocells 37 and 40 coordinated and aligned with the shutter 36. The photocells 37 are illuminated, via the shutters 35 and 36 by a light source 33 and lens 34. The light source is advantageously in the form of a gallium arsenic diode in view of the relatively small operating power required. The converter 16 together with the remaining parts and integrated circuit upon member RM may be constructed as a unit in the form of a module for removable mounting upon said member. As is understood, any equivalent analog-digital converter may be used for the purpose of the invention.

In the foregoing, the invention has been described in reference to an exemplary device or embodiment. It will be evident however, that variations and modifications, as well as the substitution of equivalent parts or circuits for those shown herein for illustration, may be made in accordance with the broader scope and spirit of the invention.

We claim:

1. A system of digital measurement of the position of a first member slidably mounted upon a second rotating member comprising in combination:
   1. a first stationary coupling coil,
   2. a second similar coupling coil upon said rotating member coaxial with the rotary axis thereof and parallel to said first coil,
   3. a stationary high-frequency power generator connected to said first coil,
   4. means mounted on said second member and including rectifying means connected to said second coil, to rectify the energy induced in said second coil from said first coil and provide a d.c. power source upon said second member,
   5. means mounted on said second member and energized by said power source to produce digital signals representative of the position of said first member relative to said second member,
   6. a high-frequency signal generator mounted upon said second member,
   7. means to modulate the output signal of said signal generator by said digital signals,
   8. means to apply the output energy of said signal generator to said second coil,
   9. a stationary receiving means connected to said first coil to derive signal energy induced in said first coil from said second coil, and
   10. demodulating means connected to said receiving means, to reproduce the original digital signals.

2. A measuring system as claimed in claim 1, wherein the carrier frequency of said signal generator is different from the carrier frequency of said power generator.

3. A measuring system as claimed in claim 1, wherein said coils are provided with center taps and the energy of said power generator is transmitted in symmetrically balanced relation and the energy of said signal generator is transmitted in unbalanced relation to said taps as reference potential points.

4. A measuring system as claimed in claim 1, wherein said modulating means varies the frequency of said signal generator and said demodulating means is a frequency discriminator.

5. A measuring system as claimed in claim 1, wherein each of said coils consist of identical pairs of winding turns disposed in common and parallel radial planes in respect to the rotary axis of said second member and wherein one pair of adjoining ends of each pair of turns are connected to one another and the remaining pairs of adjoining ends of the turns are connected respectively to the associated power generator and rectifying means.

6. A measuring system as claimed in claim 1, wherein each of said coupling coils consists of identical pairs of winding turns disposed in common and parallel radial planes in respect to the axis of rotation of said second member, wherein one pair of adjoining ends of each pair of turns are connected to one another, to provide a pair of potential reference points, wherein the remaining pairs of adjoining ends of said turns are connected respectively to the associated power generator and rectifying means, and wherein said signal generator and receiving means are connected respectively to said reference points.

7. A measuring system as claimed in claim 1, wherein said digital signal producing means comprises a rack upon said first member, a pinion engaged by said rack, and an analog-digital converter to convert the rotational angles of said pinion into proportionate numbers of digital signal pulses.

8. A measuring system as claimed in claim 7, wherein said analog-digital converter comprises a rotating shutter having alternate peripheral opaque and transparent segments and driven by said pinion, a stationary shutter having opaque and transparent segments similar to and aligned with the segments of said rotating shutter, and photo-electric pickup means including a light source and a number of photoelectric cells disposed on opposite sides of said shutters, to produce current pulses in a circuit including said cells proportional in number to the rotational angle of said pinion.

9. A measuring system as claimed in claim 7, wherein said analog-digital converter is designed to produce a first digital pulse series and a second similar pulse series in quadrature relation to said first series and leading and lagging respectively said first series in dependence upon the sense of rotation of said pinion, encoding means to combine both said pulse series into a single ternary pulse series for modulation of said signal generator and having positive and negative pulses corresponding respectively to the sense of rotation of said pinion, and decoding means connected to said demodulating means, to reconvert the demodulated ternary signals into the original quadrature pulse series.

* * * * *